(12) United States Patent
Shimizu

(10) Patent No.: US 10,990,095 B2
(45) Date of Patent: Apr. 27, 2021

(54) DISASTER MITIGATION SYSTEM FOR CONNECTED VEHICLES HAVING HIDDEN VEHICLE FUNCTIONALITY

(71) Applicant: TOYOTA JIDOSHA KABUSHIKI KAISHA, Toyota (JP)

(72) Inventor: Takayuki Shimizu, Mountain View, CA (US)

(*) Notice: Subject to any disclaimer, the term of this patent is extended or adjusted under 35 U.S.C. 154(b) by 239 days.

(21) Appl. No.: 15/967,104

(22) Filed: Apr. 30, 2018

(65) Prior Publication Data

US 2019/0332107 A1 Oct. 31, 2019

(51) Int. Cl.
| | |
|---|---|
| *B60B 39/00* | (2006.01) |
| *G05D 1/00* | (2006.01) |
| *B60W 50/12* | (2012.01) |
| *H04W 4/40* | (2018.01) |

(52) U.S. Cl.
CPC .......... *G05D 1/0061* (2013.01); *B60W 50/12* (2013.01); *B60W 2556/55* (2020.02); *H04W 4/40* (2018.02)

(58) Field of Classification Search
CPC .............. G05D 1/0061; B60W 50/12; B60W 2556/55; H04W 4/40
See application file for complete search history.

(56) References Cited

U.S. PATENT DOCUMENTS

| | | | |
|---|---|---|---|
| 9,836,962 B1* | 12/2017 | Hayward | B60K 35/00 |
| 2016/0320193 A1 | 11/2016 | Tuukkanen et al. | |
| 2017/0355380 A1* | 12/2017 | Fendt | B60W 50/0225 |
| 2019/0082312 A1* | 3/2019 | Neybert | H04W 4/21 |

FOREIGN PATENT DOCUMENTS

| | | |
|---|---|---|
| JP | 2010-015481 | 1/2010 |
| JP | 2011-081604 | 4/2011 |
| JP | 2015-172791 | 10/2015 |
| JP | 2017-110969 | 6/2017 |

OTHER PUBLICATIONS

Usborne, Simon, "How did Tesla make some of its cars travel further during Hurricane Irma? | Technology | The Guardian," retrieved from the Internet at https://www.theguardian.com/technology/shortcuts/2017/sep/11/tesla-hurricane-irma-battery-capacity, Sep. 11, 2017, 3 pages.
EPO, Extended European Search Report for European Patent Application No. 19171520.0, dated Oct. 8, 2019, 8 pages.
JPO, Office Action for Japanese Patent Application No. 2019-065436, dated Feb. 25, 2020, 3 pages.

* cited by examiner

*Primary Examiner* — Adam M Alharbi
(74) *Attorney, Agent, or Firm* — Burbage Law, P.C.; Jon-Michael Burbage; Elizabeth Ruzich

(57) ABSTRACT

The disclosure includes embodiments for providing disaster mitigation for connected vehicles having hidden vehicle functionality. In some embodiments, a method includes determining, by an onboard vehicle computer of a connected vehicle, that an extreme event is occurring. In some embodiments, the method includes automatically unlocking, by the onboard vehicle computer, hidden vehicle functionality of the connected vehicle responsive to determining that the extreme event is occurring.

20 Claims, 6 Drawing Sheets

BSM DATA 198

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 4

BSM DATA 198

Part 1
GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate)
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle Type
Weather Data 193
Disaster Data 194

Figure 5

DISASTER MITIGATION SYSTEM FOR CONNECTED VEHICLES HAVING HIDDEN VEHICLE FUNCTIONALITY

BACKGROUND

The specification relates to disaster mitigation for connected vehicles having hidden vehicle functionality.

Modern connected vehicles include "hidden" vehicle functionality that can be "locked" or "unlocked" by wireless signals which are transmitted to the connected vehicles by their manufacturers. For example, a connected vehicle includes a set of Advanced Driving Assistance Systems ("ADAS system" if singular, or "ADAS systems" if plural) that provide ADAS functionality or automated vehicle functionality. A particular ADAS functionality (or automated vehicle functionality) provided by these ADAS systems may be locked so that, although all the hardware and software necessary to provide the function is present on the vehicle, the software of the vehicle is configured so that the ADAS functionality (or automated vehicle functionality) is not available to the driver of the vehicle.

Modern vehicles are also used by drivers to flee natural disasters and other extreme events (e.g., hurricanes, tornados, forest fires, earthquakes, volcanic eruptions, tsunami, an act of war, etc.) in order to reach safer locations. A problem is that some of these vehicles include hidden vehicle functionality that might assist drivers to flee natural disaster faster or more safely if only the hidden vehicle functionality were unlocked and made available to the driver of the vehicle.

Described herein is a mitigation system installed in a connected vehicle which is operable to detect natural disasters and other extreme events and then automatically unlock hidden vehicle functionality in the connected vehicle so that driver safety is maximized as the driver uses their connected vehicle to flee the natural disasters and the other extreme events.

SUMMARY

Described herein are embodiments of a mitigation system installed in a connected vehicle having hidden vehicle functionality. In some embodiments, the mitigation system includes software installed in an Electronic Control Unit (ECU) of the connected vehicle. In some embodiments, the mitigation system includes code and routines that are operable, when executed by the ECU, to cause the ECU to monitor for natural disasters and extreme events. When a natural disaster or extreme event is detected in a particular geographic region, mitigation system automatically unlocks hidden vehicle functionality for the connected vehicle which is located in that geographic region based on the occurrence of the extreme event in their geographic proximity.

In some embodiments, the mitigation system can either: (1) unlock all the hidden features of the connected vehicle [i.e., an "omnibus unlocking"]; or (2) selectively unlock hidden vehicle functionality based on the particular extreme event which is occurring or the driver's specific context relative to the extreme event [i.e., a "selective unlocking"].

As an example, which is meant to introduce what is meant by selective unlocking, if the natural disaster is a hurricane and the connected vehicle is experiencing a lot of water on the roadways, then the mitigation system, when executed by the ECU, causes the ECU to unlock any hidden vehicle functionality which would help the connected vehicle to do a better job of safely traversing over the wet roadway surface (e.g., unlocking hidden traction control ADAS functionality). In some embodiments, the mitigation system, when executed by the ECU, causes the ECU to unlock other relevant functionality such as battery capacity limitations or telematics that will assist the driver to respond appropriately to the extreme event. Other examples are possible; this example is only illustrative.

There are existing solutions which introduce the concept of using over the air software updates to unlock hidden vehicle functionality. However, the existing solutions do not consider any special applications of this concept. For example, these existing solutions do not consider the problem of how to use this concept to increase driver safety during natural disasters and other extreme events. The mitigation system described herein solves this problem. For example, the mitigation system includes functionality that enables the connected vehicle to trigger a software update (e.g., by issuing an unlock command for hidden vehicle functionality when an extreme event is detected) even when it does not have access to a wireless network, which is a typical situation in natural disasters and extreme events. Additionally, the mitigation system described herein uses electronic signals to detect the occurrence of natural disasters in specific geographic regions, and this is not done by the existing solutions because the existing solutions are unconcerned with detecting the occurrence with such events. As a further improvement relative to the existing solutions, the mitigation system also unlocks hidden vehicle functionality based on a specific trigger event, i.e., a detection of a natural disaster or other extreme event in a geographic region which includes an affected vehicle; the existing solutions do not use a similar trigger event. In some embodiments, the mitigation system also provides "selective unlocking" by determining a driver's specific context within a natural disaster or other extreme event and determines instances of hidden vehicle functionality to unlock based on the driver's specific context. The existing solutions do not provide similar "selective unlocking" functionality.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: determining, by an onboard vehicle computer system of a connected vehicle, that an extreme event is occurring; and automatically unlocking, by the onboard vehicle computer, hidden vehicle functionality of the connected vehicle responsive to determining that the extreme event is occurring. Other embodiments of this aspect include corresponding computer systems, apparatus, and computer programs recorded on one or more computer storage devices, each configured to perform the actions of the methods.

Implementations may include one or more of the following features. The method where the extreme event is selected from a group that consists of one or more of the following: a natural disaster; a hurricane; a tornado; a forest fire; an earthquake; a volcanic eruption; a tsunami; and an act of war. The method where the hidden vehicle functionality includes an autonomous functionality that is locked so that the autonomous functionality is inaccessible by a driver of the vehicle. The method where the hidden vehicle functionality includes an ADAS functionality that is locked so that the ADAS functionality is inaccessible by a driver of the vehicle. The method where the hidden vehicle functionality is unlocked by the onboard vehicle computer system providing an electronic signal that includes an unlock command to an ECU that executes an ADAS system of the connected vehicle that provides the hidden vehicle functionality. The method where the connected vehicle is at least a Level 3 automated vehicle. The method where the hidden vehicle functionality includes one or more of the following: extending a battery range of the connected vehicle; and modifying a telematics functionality of the connected vehicle. The method where the extreme event is determined to be occurring responsive to digital data that is received from one of a second connected vehicle and an infrastructure device while the connected vehicle does not have access to a cellular network. Implementations of the described techniques may include hardware, a method or process, or computer software on a computer-accessible medium.

One general aspect includes a system of a connected vehicle including a processor communicatively coupled to a non-transitory memory that stores computer code that is operable, when executed by the processor, to cause the processor to: determine, by the processor, that an extreme event is occurring; and automatically unlock, by the processor, hidden vehicle functionality of the connected vehicle responsive to determining that the extreme event is occurring. Other embodiments of this aspect include corresponding computer systems, apparatus, and computer programs recorded on one or more computer storage devices, each configured to perform the actions of the methods.

Implementations may include one or more of the following features. The system where the extreme event is selected from a group that consists of one or more of the following: a natural disaster; a hurricane; a tornado; a forest fire; an earthquake; a volcanic eruption; a tsunami; and an act of war. The system where the hidden vehicle functionality includes an autonomous functionality that is locked so that the autonomous functionality is inaccessible by a driver of the vehicle. The system where the hidden vehicle functionality includes an ADAS functionality that is locked so that the ADAS functionality is inaccessible by a driver of the vehicle. The system where the hidden vehicle functionality is unlocked by processor providing an electronic signal that includes an unlock command to an ECU that executes an ADAS system of the connected vehicle that provides the hidden vehicle functionality. The system where the connected vehicle is at least a level 3 automated vehicle. The system where the extreme event is determined to be occurring responsive to digital data that is received from one of a second connected vehicle and an infrastructure device while the connected vehicle does not have access to a cellular network. Implementations of the described techniques may include hardware, a method or process, or computer software on a computer-accessible medium.

One general aspect includes a computer program product of a connected vehicle including instructions that, when executed by one or more processors of the connected vehicle, cause the one or more processors to perform operations including: determining, by the one or more processors of the connected vehicle, that an extreme event is occurring; and automatically unlocking, by one or more processors, hidden vehicle functionality of the connected vehicle responsive to determining that the extreme event is occurring. Other embodiments of this aspect include corresponding computer systems, apparatus, and computer programs recorded on one or more computer storage devices, each configured to perform the actions of the methods.

Implementations may include one or more of the following features. The computer program product where the extreme event is selected from a group that consists of one or more of the following: a natural disaster; a hurricane; a tornado; a forest fire; an earthquake; a volcanic eruption; a tsunami; and an act of war. The computer program product where the hidden vehicle functionality includes an autonomous functionality that is locked so that the autonomous functionality is inaccessible by a driver of the vehicle. The computer program product where the hidden vehicle functionality includes an ADAS functionality that is locked so that the ADAS functionality is inaccessible by a driver of the vehicle. The computer program product where the hidden vehicle functionality is unlocked by the one or more processors providing an electronic signal that includes an unlock command to an ECU that executes an ADAS system of the connected vehicle that provides the hidden vehicle functionality. The computer program product where the extreme event is determined to be occurring responsive to digital data that is received from one of a second connected vehicle and an infrastructure device while the connected vehicle does not have access to a cellular network. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4 and 5 are block diagrams illustrating an example of Basic Safety Message (BSM) data according to some embodiments.

DETAILED DESCRIPTION

Figure 1A:
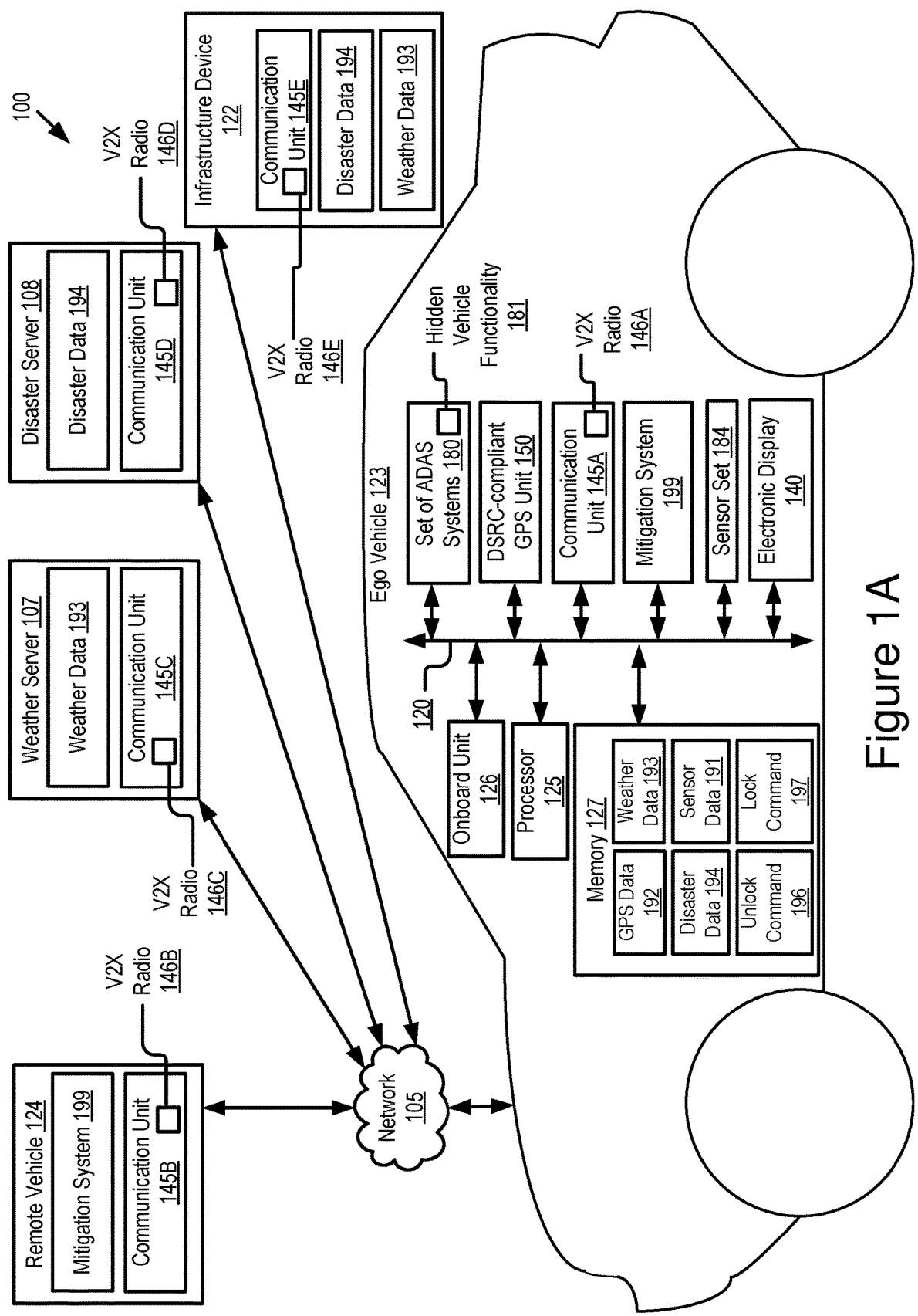
FIG. 1A is a block diagram illustrating an operating environment for a mitigation system according to some embodiments.

Connected vehicles have access to many different radio types such as the following: Dedicated Short-Range Communication (DSRC); Long-Term Evolution (LTE); wireless fidelity (WiFi); and millimeter wave (mmWave). Connected vehicles wirelessly communicate with other vehicles via Vehicle-to-Vehicle (V2V) communication. Connected vehicles wirelessly communicate with roadway infrastructure, such as Roadside Units ("RSU" if singular, "RSUs" if plural) via Vehicle-to-Infrastructure communication. Vehicle-to-Anything (V2X) communication is a term that encompasses both V2V communication and V2I communication, collectively or individually.

Embodiments of a mitigation system are described. Examples of V2X communication that are compatible with the mitigation system include one or more of the following types of wireless V2X communication: DSRC; LTE; mmWave; 3G; 4G; 5G; LTE-Vehicle-to-Anything (LTE- V2X); LTE-Vehicle-to-Vehicle (LTE-V2V); LTE-Device-to-Device (LTE-D2D); 5G-V2X; Intelligent Transportation System-G5 (ITS-G5); ITS-Connect; Voice over LTE (VoLTE); and any derivative or fork of one or more of the V2X communication protocols listed here.

Modern connected vehicles include "hidden" vehicle functionality that can be "locked" or "unlocked" by wireless signals which are transmitted to the connected vehicles by their manufacturers. For example, a connected vehicle includes a set of ADAS systems that provide ADAS functionality or automated vehicle functionality. A particular ADAS functionality (or automated vehicle functionality) provided by these ADAS systems may be locked so that, although all the hardware and software necessary to provide the function is present on the vehicle, the software of the vehicle is configured so that the ADAS functionality (or automated vehicle functionality) is not available to the driver of the vehicle.

Modern vehicles are also used by drivers to flee natural disasters and other extreme events (e.g., hurricanes, tornados, forest fires, earthquakes, volcanic eruptions, tsunami, an act of war, etc.) in order to reach safer locations. A problem is that some of these vehicles include hidden vehicle functionality that might assist drivers to flee natural disaster faster or more safely if only the hidden vehicle functionality were unlocked and made available to the driver of the vehicle.

Described herein are embodiments of a mitigation system installed in a connected vehicle having hidden vehicle functionality. In some embodiments, the mitigation system includes software installed in an ECU of the connected vehicle. In some embodiments, the mitigation system includes code and routines that are operable, when executed by the ECU, to cause the ECU to monitor for natural disasters and extreme events. When a natural disaster or extreme event is detected in a particular geographic region, mitigation system automatically unlocks hidden vehicle functionality for the connected vehicle which is located in that geographic region based on the occurrence of the extreme event in their geographic proximity.

In some embodiments, the mitigation system can either: (1) unlock all the hidden features of the connected vehicle [i.e., an "omnibus unlocking"]; or (2) selectively unlock hidden vehicle functionality based on the particular extreme event which is occurring or the driver's specific context relative to the extreme event [i.e., a "selective unlocking"].

As an example, which is meant to introduce what is meant by selective unlocking, if the natural disaster is a hurricane and the connected vehicle is experiencing a lot of water on the roadways, then the mitigation system, when executed by the ECU, causes the ECU to unlock any hidden vehicle functionality which would help the connected vehicle to do a better job of safely traversing over the wet roadway surface (e.g., unlocking hidden traction control ADAS functionality). In some embodiments, the mitigation system, when executed by the ECU, causes the ECU to unlock other relevant functionality such as increasing a battery capacity limitation of an electric vehicle or modifying telematics functionality of the electric vehicle (or some other connected vehicle) to provide telematics functionality that will assist the driver to respond appropriately to the extreme event. Other examples are possible; this example is only illustrative.

In some embodiments, telematics functionality includes one or more of the following: the technology of sending, receiving, and storing digital information via telecommunication devices in conjunction with effecting control on remote objects; the integrated use of telecommunications and informatics for application in vehicles and with control of vehicles on the move; GPS technology integrated with computers and mobile communications technology in automotive navigation systems; and other vehicle telematics functionality. In some embodiments, telematics does not include telemetry because telemetry does not include effecting control on remote objects.

In some embodiments, the mitigation system includes software installed in a connected vehicle that includes hidden vehicle functionality. For example, the mitigation system is installed in an onboard unit of the connected vehicle, or some other onboard vehicle computer such as an ECU or onboard unit. In some embodiments, the mitigation system includes code and routines that are operable, when executed by onboard vehicle computer, to cause the onboard vehicle computer to execute one or more of the following steps: (1) accessing electronic weather data and electronic disaster data to identify the occurrence of extreme events in a specific geographic region where a connected vehicle is located; (2) automatically, and temporarily, unlocking all software-based functionality (e.g., battery capacity limit, telematics) that would assist the driver of the connected vehicle to respond appropriately to the extreme event (i.e., evacuate); (3) accessing electronic weather data and other electronic data to identify that the extreme event has ended; and (4) automatically locking all the software-based functionality that was unlocked in the preceding step (2).

Note that each of the steps described above is implemented by the mitigation system that is an element of a connected vehicle, and not a remote cloud server. By comparison, the existing solutions are executed by a cloud server whose operation is controlled by a vehicle manufacturer. Use of a cloud server when mitigating an extreme event is risky due to the extra time needed for communications between the connected vehicle and the cloud server, and the possibility that wireless communications between the connected vehicle and the cloud server may be unavailable due to the extreme event. Accordingly, the existing solutions are not well adapted to solve the problem solved by the embodiments of the mitigation system described herein for this additional reason as well as the other reasons described above.

The terms "extreme event," "weather data" and "disaster data" are now described according to some embodiments of the mitigation system.

An extreme event includes a natural disaster or national emergency. For example, an extreme event includes one or more of the following: a hurricane; a tornado; a forest fire; an earthquake; a volcanic eruption; a tsunami; an act of war; etc.

The weather data is digital data that describes the weather and weather events such as hurricanes, tornados, tsunamis, etc. In some embodiments, the weather data is provided by the National Weather Service (NWS), or some other source of electronic weather data. Examples of Rich Site Summary (RSS) streams of weather data are viewable at alerts.weather.gov/ according to some embodiments.

The disaster data is digital data that describes extreme events such as natural disasters. In some embodiments, the disaster data is provided by the Federal Emergency Management Agency (FEMA) which publishes streams of disaster data via their servers. Examples of the disaster data are viewable at fema.gov/disasters according to some embodiments.

In some embodiments, the connected vehicles that includes the mitigation system are DSRC-equipped vehicles.

A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard. The BSM data is described in more detail below with reference to FIGS. 11 and 12 according to some embodiments.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States and Europe, DSRC messages are transmitted at 5.9 GHz. In the United States, DSRC messages are allocated 75 MHz of spectrum in the 5.9 GHz band. In Europe, DSRC messages are allocated 30 MHz of spectrum in the 5.9 GHz band. In Japan, DSRC messages are transmitted in the 760 MHz band with 10 MHz of spectrum. A wireless message, therefore, is not a DSRC message unless it operates in the 5.9 GHz band in the United States and Europe or the 760 MHz band in Japan. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data (e.g., the GPS data 192) that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

Referring to FIG. 1A, depicted is an operating environment 100 for a mitigation system 199 according to some embodiments. As depicted, the operating environment 100 includes the following elements: an ego vehicle 123; a remote vehicle 124; an infrastructure device 122; a weather server 107 and a disaster server 108. These elements are communicatively coupled to one another by a network 105.

Figure 1B:
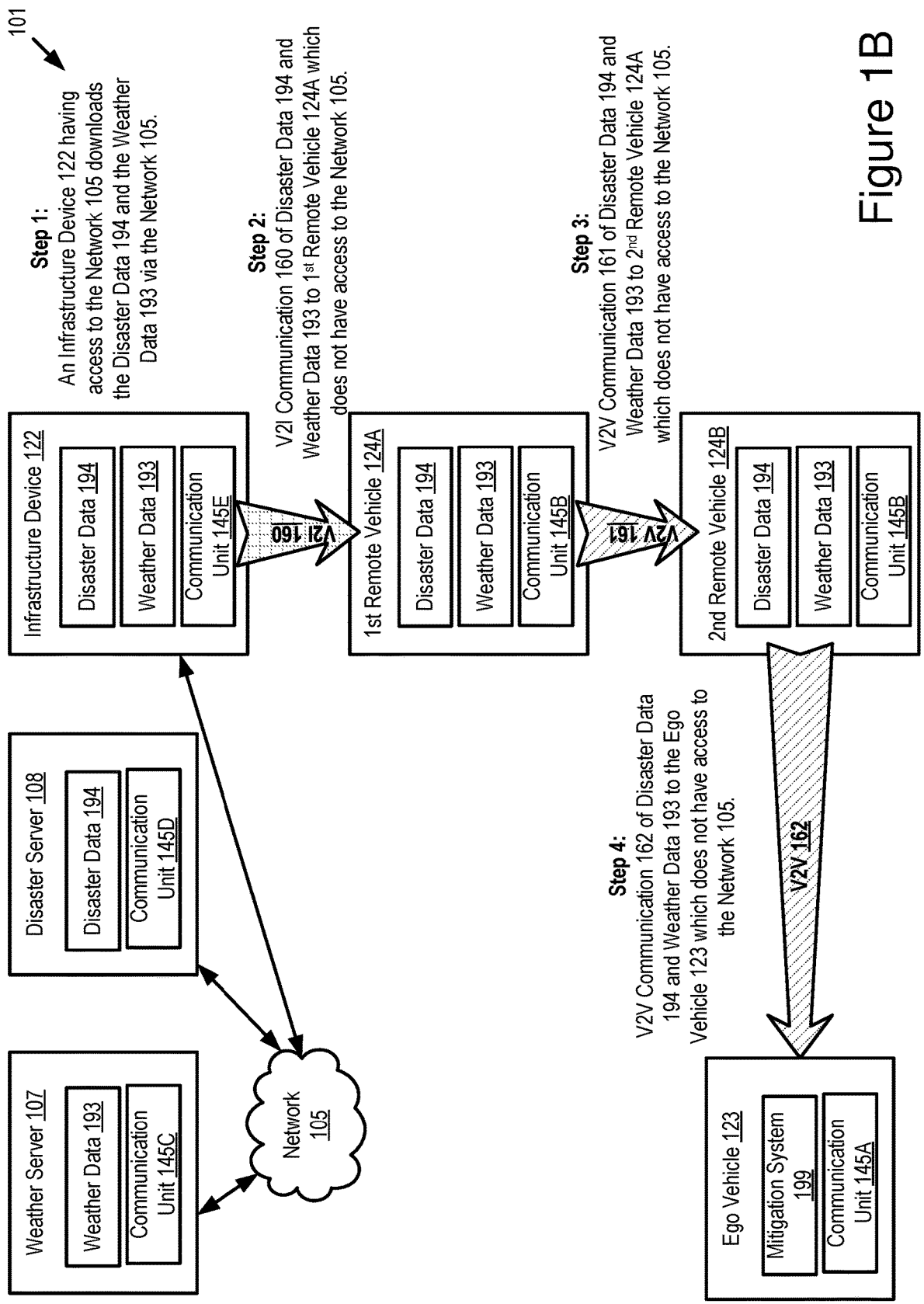
FIG. 1B is a block diagram illustrating a flow process executed by the mitigation system according to some embodiments.

Although one ego vehicle 123, one remote vehicle 124, one infrastructure device 122, one weather server 107, one disaster server 108, and one network 105 are depicted in FIG. 1A, in practice the operating environment 100 may include one or more ego vehicles 123, one or more remote vehicles 124, one or more V2X-connected devices 122, one or more weather servers 107, one or more disaster servers 108, and one or more networks 105. For example, FIG. 1B depicts two remote vehicles 124.

Referring back to FIG. 1A, both the ego vehicle 123 and the remote vehicle 124 are connected vehicles. For example, each of the ego vehicle 123 and the remote vehicle 124 include a communication unit 145A, 145B and are therefore each a connected vehicle that is operable to send and receive electronic messages via the network 105.

The following devices provide similar functionality, include similar components and are referred to collectively or individually as the "communication unit 145": the communication unit 145A of the ego vehicle 123; the communication unit 145B of the remote vehicle 124; a communication unit 145C of the weather server 107; a communication unit 145D of the disaster server 108; and a communication unit 145E of the infrastructure device 122.

The following devices provide similar functionality, include similar components and are referred to collectively or individually as the "V2X radio 146": the V2X radio 146A of the ego vehicle 123; the V2X radio 146B of the remote vehicle 124; a V2X radio 146C of the weather server 107; a V2X radio 146D of the disaster server 108; and a V2X radio 146E of the infrastructure device 122.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, 5G-V2X, ITS-G5, ITS-Connect, VoLTE or any other mobile data network or combination of mobile data networks. Further, the network 105 may include one or more IEEE 802.11 wireless networks.

The following are endpoints of the network 105: the ego vehicle 123; the remote vehicle 124; the infrastructure device 122; the weather server 107; and the disaster server 108. In some embodiments, the ego vehicle 123 and the remote vehicle 124 include an instance of the mitigation system 199. The ego vehicle 123 and the remote vehicle 124 may be referred to collectively or individually as a "vehicular endpoint" or the "vehicular endpoints." In some embodiments, the vehicular endpoints do not have access to the network 105 (e.g., because a natural disaster or some other extreme event has disabled the network 105) and the vehicle endpoints communicate with one another via V2V communication of the infrastructure device 122 via V2I communication. In this way, the vehicular endpoints are able to receive one or more of the weather data 193 and the disaster data 194 which triggers the mitigation system 199 to issue an unlock command 196 as described herein.

The ego vehicle 123 is any type of connected vehicle. For example, the ego vehicle 123 is one of the following types of vehicles that includes a communication unit 145A: a car; a truck; a sports utility vehicle; a bus; a semi-truck; a robotic car; a drone or any other roadway-based conveyance. In some embodiments, the ego vehicle 123 is a DSRC-equipped vehicle.

In some embodiments, the ego vehicle 123 is an autonomous vehicle or a semi-autonomous vehicle. For example, the ego vehicle 123 includes a set of Advanced Driver Assistance Systems 180 (a set of ADAS systems 180) which provide autonomous features to the ego vehicle 123 which are sufficient to render the ego vehicle 123 an autonomous vehicle. The set of ADAS systems 180 includes one or more ADAS systems.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems 180 installed in a vehicle have no vehicle control. The set of ADAS systems 180 may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 180 installed in the autonomous vehicle may provide autonomous features such as one or more of the following: Adaptive Cruise Control (ACC); and Parking Assistance with automated steering and Lane Keeping Assistance (LKA) Type II, in any combination.

Level 2: The driver is obliged to detect objects and events in the roadway environment and respond if the set of ADAS systems 180 installed in the autonomous vehicle fail to respond properly (based on the driver's subjective judgement). The set of ADAS systems 180 installed in the autonomous vehicle executes accelerating, braking, and steering. The set of ADAS systems 180 installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The set of ADAS systems 180 installed in the autonomous vehicle can control the autonomous vehicle in all but a few environments such as severe weather. The driver must enable the automated system (which is comprised of the set of ADAS systems 180 installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The set of ADAS systems 180 includes one or more of the following ADAS systems: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a LKA system); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or an "ADAS functionality," respectively. The features and functionality provided by these example ADAS systems are also referred to herein as an "autonomous feature" or an "autonomous functionality," respectively.

In some embodiments, one or more of these autonomous features (or autonomous functionalities) or ADAS features (or ADAS functionalities) is a hidden vehicle functionality 181. For example, the ego vehicle 123 has one or more ADAS systems of the ADAS system set 180 that are not activated (i.e., "locked") and are operable to be activated (i.e., "unlocked") by the mitigation system 199. The ego vehicle 123 may also include other onboard systems which are operable to be locked, unlocked, or reconfigured by the mitigation system 199 responsive to a detected natural disaster or other extreme event; these onboard systems are also included in the hidden vehicle functionality 181 according to some embodiments.

In some embodiments, the ego vehicle 123 is an electric vehicle and the ego vehicle 123 includes a battery system that can be reconfigured by the mitigation system 199 to increase the range of the ego vehicle 123, thereby increasing the ability of the ego vehicle 123 to reach a desired destination. Here, reconfiguring the battery system to increase the range of the ego vehicle 123 is an example of a hidden vehicle functionality 181 of the ego vehicle 123 which is operable to be locked, unlocked, or reconfigured by the mitigation system 199.

In some embodiments, the ego vehicle 123 includes the following elements: the set of ADAS systems 180; an onboard unit 126; a processor 125; a memory 127; a communication unit 145; a DSRC-compliant GPS unit 150; a sensor set 184; an electronic display 140; and a mitigation system 199. These elements of the ego vehicle 123 are communicatively coupled to one another via a bus 120.

The set of ADAS systems 180 was described above, and so, that description will not be repeated here.

In some embodiments, the processor 125 and the memory 127 may be elements of an onboard vehicle computer system. The onboard vehicle computer system may be operable to cause or control the operation of the mitigation system 199 of the ego vehicle 123. The onboard vehicle computer system may be operable to access and execute the data stored on the memory 127 to provide the functionality described herein for the mitigation system 199 of the ego vehicle 123 or its elements. The onboard vehicle computer system may be operable to execute the mitigation system 199 which causes the onboard vehicle computer system to execute one or more steps of the method 300 described below with reference to FIG. 3 or the flow process 101 described below with reference to FIG. 1B.

In some embodiments, the processor 125 and the memory 127 may be elements of the onboard unit 126. The onboard unit 126 includes an ECU or an onboard vehicle computer system that may be operable to cause or control the operation of the mitigation system 199. In some embodiments, the onboard unit 126 is operable to access and execute the data stored on the memory 127 to provide the functionality described herein for the mitigation system 199 or its elements. The onboard unit 126 may be operable to execute the mitigation system 199 which causes the onboard unit 126 to execute one or more steps of the method 300 described below with reference to FIG. 3 or the flow process 101 described below with reference to FIG. 1B.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data 192 describing the location of the ego vehicle 123 with lane-level accuracy. For example, the ego vehicle 123 is traveling in a lane of a roadway. Lane-level accuracy means that the location of the ego vehicle 123 is described by the GPS data 192 so accurately that the ego vehicle's 123 lane of travel within the roadway may be accurately determined based on the GPS data 192 for this ego vehicle 123 as provided by the DSRC-compliant GPS unit 150. In some embodiments, the GPS data 192 is an element of the BSM data that is transmitted by the communication unit 145A as an element of a BSM.

In some embodiments, the DSRC-compliant GPS unit 150 includes hardware that wirelessly communicates with a GPS satellite to retrieve GPS data 192. The GPS data 192 is digital data that describes the geographic location of the ego vehicle 123 with a precision that is compliant with the DSRC standard. The DSRC standard requires that GPS data 192 be precise enough to infer if two vehicles (one of which is, for example, the ego vehicle 123) are located in adjacent lanes of travel. In some embodiments, the DSRC-compliant GPS unit 150 is operable to identify, monitor and track its two-dimensional position within 1.5 meters of its actual position 68% of the time under an open sky. Since driving lanes are typically no less than 3 meters wide, whenever the two-dimensional error of the GPS data 192 is less than 1.5 meters the mitigation system 199 described herein may analyze the GPS data 192 provided by the DSRC-compliant GPS unit 150 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 150, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data 192 alone; instead, systems having only conventional GPS units must utilize sensors such as cameras to identify the ego vehicle's 123 lane of travel. Identifying a lane of travel of a vehicle is beneficial, for example, because in some embodiments this accuracy helps to identify the ego vehicle's geographic region (e.g., if the ego vehicle 123 is on the border of two or more regions, and this distinction affects whether the ego vehicle 123 is affected by a natural disaster or extreme event). See, e.g., step 301 of the method 300 described below with reference to FIG. 3 which discusses determining a specific geographic region of the ego vehicle 123 according to some embodiments.

In some embodiments, the ego vehicle 123 may include a sensor set 184. The sensor set 184 includes one or more sensors that are operable to measure the physical environment outside of the ego vehicle 123. For example, the sensor set 184 may include one or more sensors that record one or more physical characteristics of the physical environment that is proximate to the ego vehicle 123. The memory 127 may store sensor data 191. The sensor data 191 is digital data that describes the one or more physical characteristics recorded by the one or more sensors of the sensor set 184.

In some embodiments, the sensor set 184 includes any sensors which are necessary to record the sensor data 191. In some embodiments, the sensor data 191 is digital data that describes the context of the ego vehicle 123. For example, the context described by the sensor data 191 describes one or more of the following: whether the roadways traveled by the ego vehicle 123 are slippery; whether the ego vehicle 123 is presently located in a traffic jam; whether the ego vehicle 123 was previously located in a traffic jam; how long the ego vehicle 123 has been stuck in traffic jams during a current journey of the ego vehicle; how many miles the ego vehicle 123 has traveled during some predetermined amount of time (this measurement may be used by the mitigation system 199 to determine whether the ego vehicle 123 is affected by traffic jams during the current journey of the ego vehicle 123); whether the ego vehicle 123 is located the presence of high winds; the speed of the winds that the ego vehicle 123 is being subjected to; and the pressure applied to the ego vehicle 123 by the winds that strike the surface of the ego vehicle 123.

In some embodiments, the sensor set 184 of the ego vehicle 123 may include one or more of the following vehicle sensors: a clock; a network traffic sniffer; a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. In some embodiments, the DSRC-compliant GPS unit 150 is an element of the sensor set 184.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 is a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 146A. The V2X radio 146A is a hardware unit that includes a transmitter and a receiver that is operable to send and receive wireless messages via any V2X protocol. For example, the V2X radio 146A includes any hardware and software that is necessary to send and receive one or more of the following types of V2X message: DSRC; LTE; millimeter wave communication; 3G; 4G; 5G; LTE-V2X; LTE-V2V; LTE-D2D; 5G-V2X; ITS-G5; ITS-Connect; VoLTE; and any derivative or fork of one or more of the V2X communication protocols listed here.

In some embodiments, the V2X radio 146A is a multi-channel V2X radio that includes a plurality of channels. In some embodiments, some of the channels are operable to send and receive V2X messages via a first V2X protocol whereas some of the channels are operable to send and receive V2X messages via an Nth V2X protocol.

In some embodiments, the V2X radio 146A is a DSRC radio. For example, the V2X radio 146A is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages ("PSM" if singular, or "PSMs" if plural) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs.

In some embodiments, the V2X radio 146A includes a non-transitory memory which stores digital data that controls the frequency for broadcasting BSMs. In some embodiments, the non-transitory memory stores a buffered version of the GPS data 192 for the ego vehicle 123 so that the GPS data 192 for the ego vehicle 123 is broadcast as an element of the BSMs which are regularly broadcast by the V2X radio 146A. BSMs may be broadcast by the V2X radio 146A over various V2X protocols, and not just DSRC.

In some embodiments, the V2X radio 146A includes any hardware or software which is necessary to make the ego vehicle 123 compliant with the DSRC standards. In some embodiments, the DSRC-compliant GPS unit 150 is an element of the V2X radio 146A.

In the depicted embodiment, the endpoints depicted in FIG. 1A include a communication unit such as the communication unit 145A of the ego vehicle 123 (e.g., the communication units 145B, 145C, 145D, 145E) and these communication units are referred to collectively or individually as the "communication unit 145." In the depicted embodiment, the communication units 145 include a V2X radio such as the V2X radio 146A of the ego vehicle 123 (e.g., the V2X radios 146B, 146C, 146D, 146E) and these V2X radios are referred to collectively or individually as the "V2X radio 146."

The electronic display 140 includes any type of electronic display device including, for example, one or more of the following: a dash meter display of the ego vehicle 123; a heads-up display unit (HUD) of the ego vehicle 123; an augmented reality (AR) display or viewing device of the ego vehicle 123; and a head unit of the ego vehicle 123. An example of a suitable HUD and AR viewing device is described in U.S. patent application Ser. No. 15/603,086 filed on May 23, 2017 and entitled "Providing Traffic Mirror Content to a Driver," the entirety of which is hereby incorporated by reference. Another example of a suitable HUD and AR viewing device is described in U.S. patent application Ser. No. 15/591,100 filed on May 9, 2017 and entitled "Augmented Reality for Vehicle Lane Guidance," the entirety of which is hereby incorporated by reference.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

The memory 127 of the ego vehicle 123 stores one or more of the following types of digital data: the sensor data 191; the GPS data 192; the weather data 193; the disaster data 194; the unlock command 196; and the lock command 197.

In some embodiments the memory 127 stores the BSM data 198 depicted in FIGS. 4 and 5. The BSM data 198 may be received as a payload for a BSM that is received from the infrastructure device 122, the remote vehicle 124, the weather server 107 or the disaster server 108. For example, in some embodiments one or more of the weather data 193 and the disaster data 194 may be included in the BSM data 198 and relayed to the ego vehicle 123 from one or more of the endpoints of the operating environment 100.

In some embodiments, the memory 127 stores DSRC data which is digital data received in a DSRC message or transmitted as a DSRC message. The DSRC data describes any information that is included in the BSM data 198. For example, a BSM message is a special type of DSRC message which is transmitted at a regular interval (e.g., once every 0.10 seconds), but the content or payload of a DSRC message (i.e., the DSRC data) is the same as that of a BSM message (i.e., the DSRC data for a DSRC message is the same as or similar to the BSM data for a BSM message).

In some embodiments, the memory 127 stores, as digital data, any data described herein. In some embodiments, the memory 127 stores any data that is necessary for the mitigation system 199 to provide its functionality.

The sensor data 191 is digital data that describes the sensor measurements of the one or more sensors included in the sensor set 184.

The GPS data 192 is digital data that describes the geographic location of the ego vehicle 123. In some embodiments, the GPS data 192 describes the geographic location of the ego vehicle 123 with lane-level accuracy.

The weather data 193 is digital data that describes the weather and weather events such as hurricanes, tornados, tsunamis, etc. In some embodiments, the weather data is provided by the NWS, or some other source of electronic weather data 193. Examples of RSS streams of weather data 193 are viewable at alerts.weather.gov/ according to some embodiments. The weather data 193 is transmitted to the ego vehicle 123 by the weather server 107. For example, the weather server 107 is operated by the NWS or some other source of electronic weather data 193. In some embodiments, the mitigation system 199 causes the communication unit 145 to transmit the GPS data 192 of the ego vehicle 123 to the weather server 107 and the weather server 107 responds with weather data 193 that describes the weather and weather events for the geographic location described by the GPS data 192.

In some embodiments, the network 105 is not accessible by the ego vehicle 123 (e.g., due to an extreme event) and the mitigation system 199 causes the communication unit 145 of the ego vehicle 123 to execute one or more of the following steps: transmit the GPS data 192 to the weather server 107 via a V2I communication which is transmitted to the infrastructure device 122 and then relayed to the weather server 107 by the infrastructure device (e.g., the infrastructure device 122 has access to the network 105 but the ego vehicle 123 does not); and receive a V2I communication from the infrastructure device 122 that includes weather data 193 describing the weather and weather events that are relevant for the geographic location described by the GPS data 192. In this way, the mitigation system 199 receives weather data 193 that is relevant to the geographic region of the ego vehicle 123 even when the network 105 is not accessible by the ego vehicle 123. This embodiment is an example of a V2I multi-hop communication because the ego vehicle receives the weather data 193 via a V2I communication received from the infrastructure device 122. In another embodiment, FIG. 1B depicts an embodiment where the weather data 193 is received from a remote vehicle 124 via a V2V and V2I multi-hop communication.

The disaster data 194 is digital data that describes extreme events such as natural disasters. In some embodiments, the disaster data 194 is provided by FEMA which publishes streams of disaster data 194 via their servers. Examples of the disaster data are viewable at fema.gov/disasters according to some embodiments. The disaster data 194 is transmitted to the ego vehicle 123 by the disaster server 108. For example, the disaster server 108 is operated by FEMA or some other source of electronic disaster data 194.

In some embodiments, the network 105 is not accessible by the ego vehicle 123 (e.g., due to an extreme event) and the mitigation system 199 causes the communication unit 145 of the ego vehicle 123 to execute one or more of the following steps: transmit the GPS data 192 to the weather server 107 via a V2I communication which is transmitted to the infrastructure device 122 and then relayed to the weather server 107 by the infrastructure device (e.g., the infrastructure device 122 has access to the network 105 but the ego vehicle 123 does not); and receive a V2I communication from the infrastructure device 122 that includes disaster data 194 describing one or more extreme events affecting the geographic location described by the GPS data 192. In this way, the mitigation system 199 receives disaster data 194 that is relevant to the geographic region of the ego vehicle 123 even when the network 105 is not accessible by the ego vehicle 123. This embodiment is an example of a V2I multi-hop communication because the ego vehicle 123 receives the disaster data 194 via a V2I communication received from the infrastructure device 122. In another embodiment, FIG. 1B depicts an embodiment where the disaster data 194 is received from a remote vehicle 124 via a multi-hop V2V communication.

An unlock command 196 is digital data that instructs a hidden vehicle functionality 181 to be unlock and is operable to cause the hidden vehicle functionality 181 to either be unlocked or reconfigured so that the hidden vehicle functionality is 181 accessible.

A lock command 197 is digital data that instructs a hidden vehicle functionality 181 to be locked and is operable to cause the hidden vehicle functionality 181 to either be locked or reconfigured so that the hidden vehicle functionality is 181 inaccessible.

In some embodiments, an ADAS system that provides the hidden vehicle functionality 181 is stored on an executed by an ECU of the ego vehicle. The hidden vehicle functionality 181 is unlocked by an onboard vehicle computer system of the ego vehicle 123 providing the unlock command 196 to the ECU that executes the ADAS system of the ego vehicle 123 that provides the hidden vehicle functionality 181. Similarly, in some embodiments the hidden vehicle functionality 181 is locked by the onboard vehicle computer system of the ego vehicle 123 providing the lock command 197 to the ECU that executes the ADAS system of the ego vehicle 123 that provides the hidden vehicle functionality 181. Both the unlock command 196 and the lock command 197 are included in electronic control signals that are generated by the mitigation system 199 and transmitted to the ECU by the onboard vehicle computer of the ego vehicle 123.

Figure 3:
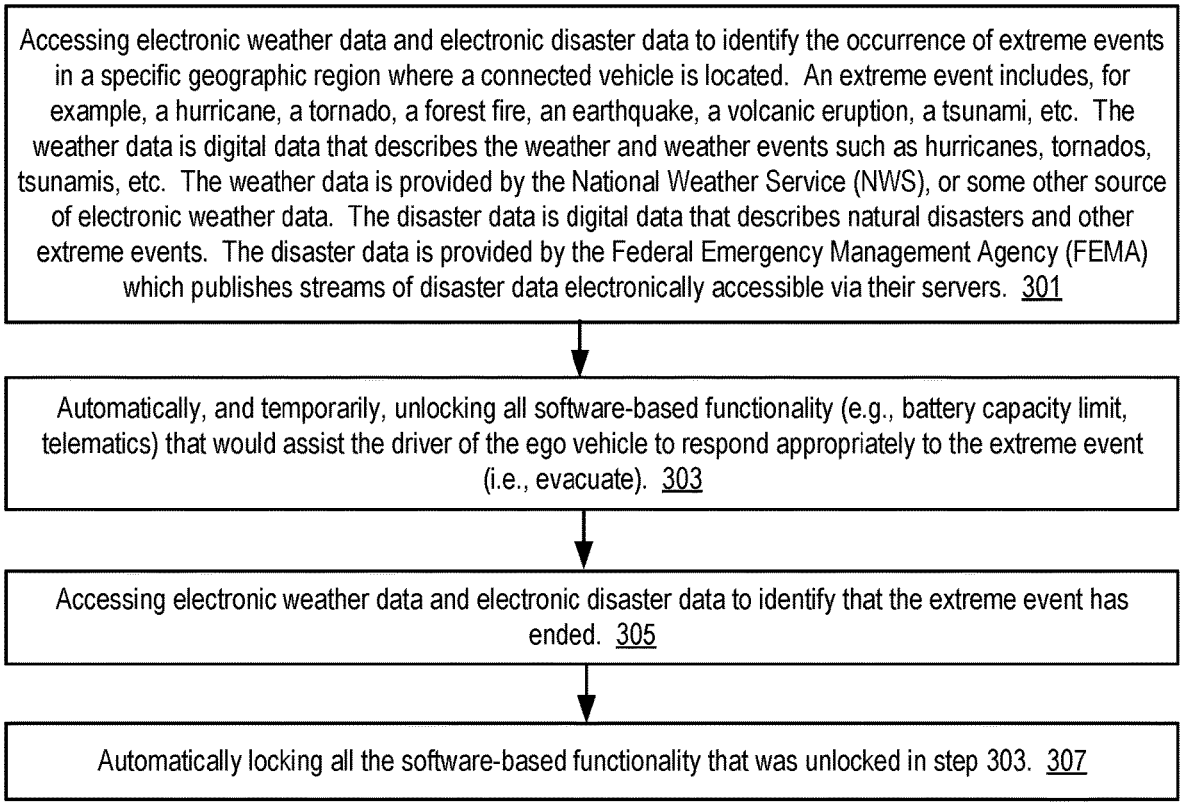
FIG. 3 depicts a method for providing disaster mitigation for connected vehicles having hidden vehicle functionality according to some embodiments.

In some embodiments, the mitigation system 199 includes software that is operable, when executed by the processor 125, to cause the processor 125 to execute one or more the steps of the method 300 depicted in FIG. 3 or the flow process 101 depicted in FIG. 1B.

In some embodiments, the mitigation system 199 retrieves the weather data 193 and disaster data 194. The weather data 193 and the disaster data 194 are geo-tagged, and so, they describe a geographic location and the weather/disaster events associated with that geographic location. The mitigation system 199 compares the GPS data 192 to the weather data 193 and the disaster data 194 to determine whether the ego vehicle 123 is presently located at a geographic location experiencing a natural disaster or some other extreme event. If the ego vehicle 123 is present at a geographic location experiencing a natural disaster or extreme event, then mitigation system 199 responds by issuing an unlock command 196 to the hidden vehicle functionality 181 so that they become unlocked and available to the driver of the ego vehicle 123. In some embodiments, the mitigation system 199 analyses the sensor data 191 to determine the specific context for the ego vehicle 123 and then selectively unlocks hidden vehicle functionality 181 that corresponds to the events that the ego vehicle 123 is experiencing as indicated by the sensor data 191. The mitigation system 199 continues to monitor the disaster data 194 and the weather data 193 to identify when the natural disaster or extreme event has ended, and when this occurs, the mitigation system 199 issues a lock command 197 to the hidden vehicle functionality 181 that were previously unlocked so that these hidden vehicle functionality become locked again as they were prior to the natural disaster or extreme event being detected being detected by the mitigation system 199.

In some embodiments, the mitigation system 199 is implemented using hardware including a field-programmable gate array ("FPGA") or an application-specific integrated circuit ("ASIC"). In some other embodiments, the mitigation system 199 is implemented using a combination of hardware and software.

The remote vehicle 124 includes elements similar to the ego vehicle 123, and so, those descriptions will not be repeated here. For example, the remote vehicle 124 includes one or more of the following elements: a mitigation system 199; and a communication unit 145B including a V2X radio 146B. The mitigation system 199 of the remote vehicle 124 provides the same functionality as the mitigation system 199 of the ego vehicle 123, and so that description will not be repeated here. The communication unit 145 and the V2X radio 146 of the remote vehicle 124 provide the same functionality as the communication unit 145 and the V2X radio 146 of the ego vehicle 123, and so, those descriptions will not be repeated here.

Although not depicted in FIG. 1A, in some embodiments the remote vehicle 124 includes one or more of the elements of the ego vehicle 123. For example, the remote vehicle 124 includes one or more of the following: a sensor set 184; an onboard unit 126; a processor 125; a memory 127; a set of ADAS systems 180; a DSRC-compliant GPS unit 150; and an electronic display 140.

The mitigation system 199 of the remote vehicle 124 provides the same functionality to the remote vehicle 124 as the mitigation system 199 of the ego vehicle 123 provides to the ego vehicle 123.

The infrastructure device 122 includes a RSU or some other processor-based computing device that includes a communication unit 145 and a non-transitory memory that is operable to store digital data such as the weather data 193 and the disaster data 194. In some embodiments, the infrastructure device 122 is a DSRC-equipped device. The infrastructure device 122 is operable, for example, to receive V2X messages and relay these messages to other connected devices such as the ego vehicle 123, the remote vehicle 124 and the server 107. In this way, the infrastructure device 122 may relay a V2X message to an endpoint that would otherwise be outside of transmission range of an endpoint that transmitted the V2X message.

The weather server 107 is a processor-based computing device. For example, the computing device may include a standalone hardware server. In some implementations, the weather server 107 is communicatively coupled to the network 105. The weather server 107 includes network communication capabilities. The weather server 107 is operable to send and receive wireless messages via the network 105. The weather server 107 includes a non-transitory memory that stores a data structure that includes a plurality of instances of weather data 193 that are each indexed by geographic location; in this way the data structure is searchable to retrieve particular instances of weather data 193 based on a query that includes a particular instance of GPS data 192. The weather server 107 includes a communication unit 145 having a V2X radio 146. The communication unit 145 and the V2X radio 146 of the weather server 107 provide the same or similar functionality as the communication unit 145 and the V2X radio 146 of the ego vehicle 123, and so, those descriptions will not be repeated here. The communication unit 145 of the weather server 107 receives a wireless message transmitted by the ego vehicle 123 and including the GPS data 192 for the ego vehicle 123. The weather server 107 retrieves a particular instance of weather data 193 that describes the weather and weather conditions for the geographic location described by this GPS data 192. The weather server 107 causes the communication unit 145 of the weather server 107 to transmit a wireless message including the weather data 193 for this particular geographic location. The communication unit 145 of the ego vehicle 123 receives the wireless message including the weather data 193 from either the network 105, a V2I message received from the infrastructure device 122 or a V2V message received from the remote vehicle 124.

The disaster server 108 is a processor-based computing device. For example, the computing device may include a standalone hardware server. In some implementations, the disaster server 108 is communicatively coupled to the network 105. The disaster server 108 includes network communication capabilities. The disaster server 108 is operable to send and receive wireless messages via the network 105. The disaster server 108 includes a non-transitory memory that stores a data structure that includes a plurality of instances of disaster data 194 that are each indexed by geographic location; in this way the data structure is searchable to retrieve particular instances of disaster data 194 based on a query that includes a particular instance of GPS data 192. The disaster server 108 includes a communication unit 145 having a V2X radio 146. The communication unit 145 and the V2X radio 146 of the disaster server 108 provide the same or similar functionality as the communication unit 145 and the V2X radio 146 of the ego vehicle 123, and so, those descriptions will not be repeated here. The communication unit 145 of the disaster server 108 receives a wireless message transmitted by the ego vehicle 123 and including the GPS data 192 for the ego vehicle 123. The disaster server 108 retrieves a particular instance of disaster data 194 that describes an extreme event affecting the geographic location described by this GPS data 192. The disaster server 108 causes the communication unit 145 of the disaster server 108 to transmit a wireless message including the disaster data 194 for this particular geographic location. The communication unit 145 of the ego vehicle 123 receives the wireless message including the disaster data 194 from either the network 105, a V2I message received from the infrastructure device 122 or a V2V message received from the remote vehicle 124.

Referring now to FIG. 1B, depicted is a block diagram illustrating a flow process 101 executed by the mitigation system 199 according to some embodiments.

The embodiment depicted in FIG. 1B includes the following elements: a weather server 107; a disaster server 108; an infrastructure device 122; a first remote vehicle 124A; a second remote vehicle 124B; and an ego vehicle 123. The weather server 107, disaster server 108 and infrastructure device 122 are communicatively coupled to one another via the network 105, whereas the infrastructure device 122, first remote vehicle 124A, second remote vehicle 124B, and ego vehicle 123 are communicatively coupled to one another via V2I or V2V communications but not the network 105. For example, the network 105 is inaccessible by the vehicular endpoints due to an extreme event.

The following elements were described above with reference to FIG. 1A, and so, their descriptions will not be repeated here: the weather server 107; the disaster server 108; the infrastructure device 122; the ego vehicle 123; and the network 105. The first remote vehicle 124A and the second remote vehicle 124B are examples of the remote vehicle 124 depicted in FIG. 1A. Accordingly, the descriptions for the first remote vehicle 124A and the second remote vehicle 124B are the same as that for the remote vehicle 124 as provided above with reference to FIG. 1A.

In some embodiments, the disaster data 194 and the weather data 193 are not retrievable by the mitigation system 199 of the ego vehicle 123 via the network 105. For example, the ego vehicle 123 including the mitigation system 199 does not have access to the network 105 due to a cellular base station being offline due during the extreme event. For example, the extreme event has caused the cellular base station to be offline due to a power outage, damaged equipment, or some other condition caused by the extreme event which prevents the ego vehicle 123 from accessing the network 105. The mitigation system 199 includes functionality that accounts for such potentialities using V2V and/or V2I multi-hop communication to retrieve the disaster data 194 and weather data 193 from other remote vehicles 124A, 124B or infrastructure devices 122. The flow process 101 depicts an example of an embodiment where both V2I and V2V multi-hop communication are used to provide the disaster data 194 and the weather data 193 to the ego vehicle 123 that includes the mitigation system 199.

In some embodiments, the flow process 101 includes one or more of the following steps: (1) the infrastructure device 122 downloads the disaster data 194 and the weather data 193 from the disaster server 108 and the weather server 107, respectively, via the network 105; (2) the infrastructure device 122 transmit a V2I communication 160 including the disaster data 194 and the weather data 193 to the first remote vehicle 124A; (3) the first remote vehicle 124A transmits a V2V communication 161 including the disaster data 194 and the weather data 193 to the second remote vehicle 124B; (4) the second remote vehicle 124B transmits a V2V communication 162 including the disaster data 194 and the weather data 193 to the ego vehicle 123.

In some embodiments, one or more of the electronic communications 160, 161, 162 is a BSM and one or more of the weather data 193 and the disaster data 194 is included in the BSM data 198 which is encoded in the BSM.

Example Computer System

Figure 2:
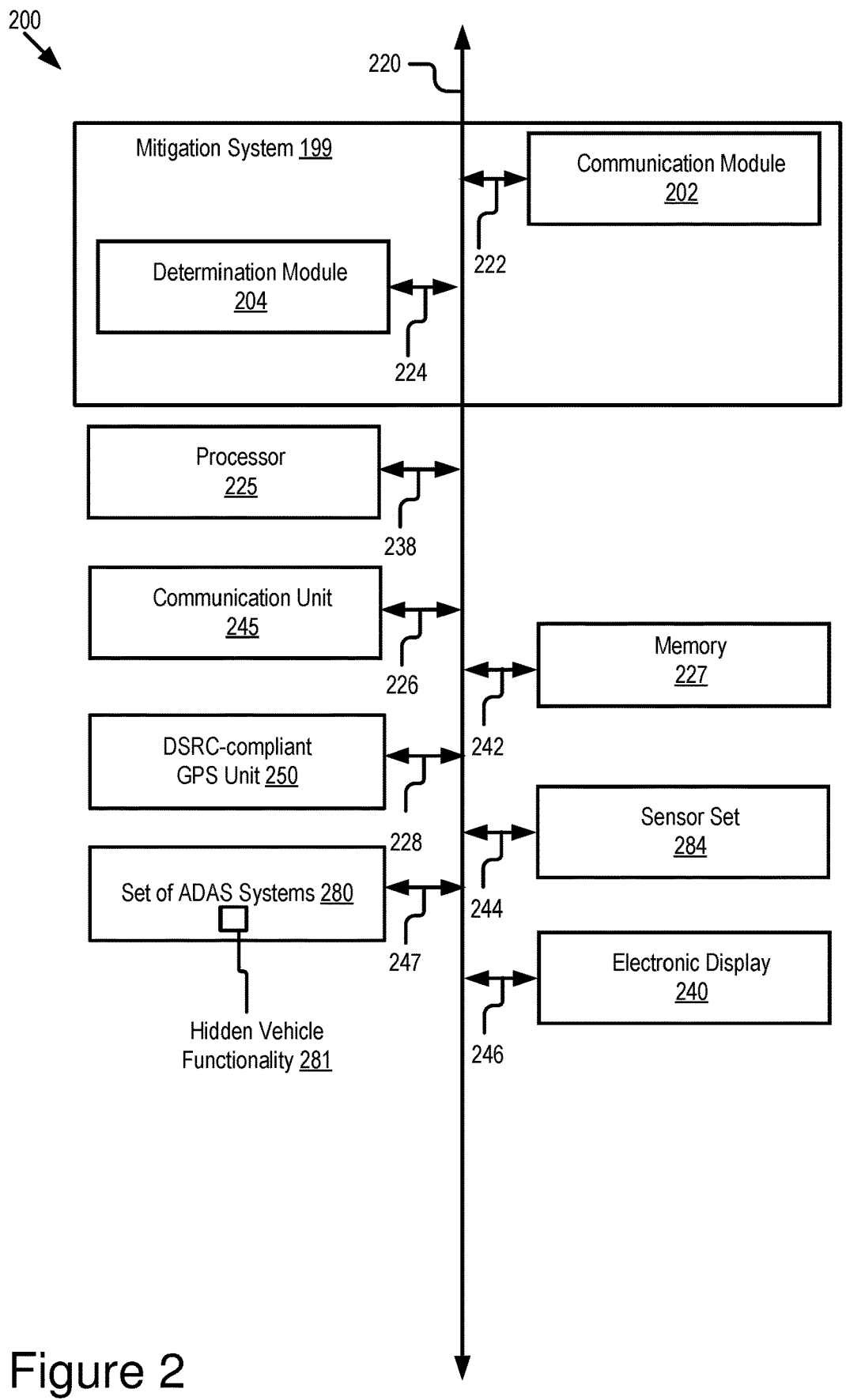
FIG. 2 is a block diagram illustrating an example computer system including the mitigation system according to some embodiments.

Referring now to FIG. 2, depicted is a block diagram illustrating an example computer system 200 including the mitigation system 199 according to some embodiments. In some embodiments, the computer system 200 may include a special-purpose computer system that is programmed to perform one or more steps the method 300 described below with reference to FIG. 3 or the flow process 101 described above with reference to FIG. 1B.

In some embodiments, the computer system 200 is an onboard vehicle computer of a vehicle such as the ego vehicle 123 or the remote vehicle 124. In some embodiments, the computer system 200 is an onboard unit of the ego vehicle 123 or the remote vehicle 124. In some embodiments, the computer system 200 is an ECU, head unit or some other processor-based computing device of the ego vehicle 123 or the remote vehicle 124.

The computer system 200 includes one or more of the following elements according to some examples: the mitigation system 199; a processor 225; a communication unit 245; a memory 227; a DSRC-compliant GPS unit 250; an electronic display 240; and a set of ADAS systems 280. The components of the computer system 200 are communicatively coupled by a bus 220.

In the illustrated embodiment, the processor 125 is communicatively coupled to the bus 220 via a signal line 238. The communication unit 245 is communicatively coupled to the bus 220 via a signal line 226. The memory 127 is communicatively coupled to the bus 220 via a signal line 242. The sensor set 284 is communicatively coupled to the bus 220 via a signal line 244. The DSRC-compliant GPS unit 150 is communicatively coupled to the bus 220 via a signal line 228. The electronic display 240 is communicatively coupled to the bus 220 via a signal line 246. The set of ADAS systems 280 is communicatively coupled to the bus 220 via a signal line 247.

The processor 225 provides similar functionality as the processor 125 described above with reference to FIG. 1A, and so, that description will not be repeated here. The communication unit 245 provides similar functionality as the communication unit 145 described above with reference to FIG. 1A, and so, that description will not be repeated here. The memory 227 provides similar functionality as the memory 127 described above with reference to FIG. 1A, and so, that description will not be repeated here. The sensor set 284 provides similar functionality as the sensor set 184 described above with reference to FIG. 1A, and so, that description will not be repeated here. The DSRC-compliant GPS unit 250 provides similar functionality as the DSRC-compliant GPS unit 150 described above with reference to FIG. 1A, and so, that description will not be repeated here. The electronic display 240 provides similar functionality as the electronic display 140 described above with reference to FIG. 1A, and so, that description will not be repeated here. The set of ADAS systems 280 provides similar functionality as the set of ADAS systems 180 described above with reference to FIG. 1A, and so, that description will not be repeated here. The set of ADAS systems 280 include a hidden vehicle functionality 281. The hidden vehicle functionality 281 provides similar functionality as the hidden vehicle functionality 181 described above with reference to FIG. 1A, and so, that description will not be repeated here.

The memory 227 may store any of the data described above with reference to FIGS. 1A and 1B or below with reference to FIGS. 3, 4, and 5. The memory 227 may store any data necessary for the computer system 200 to provide its functionality.

In the illustrated embodiment shown in FIG. 2, the mitigation system 199 includes: a communication module 202; and a determination module 204

The communication module 202 can be software including routines for handling communications between the mitigation system 199 and other components of the operating environment 100 of FIG. 1A.

In some embodiments, the communication module 202 can be a set of instructions executable by the processor 225 to provide the functionality described below for handling communications between the mitigation system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, some or all of the digital data stored on the memory 227. The communication module 202 may send or receive any of the digital data or messages described above with reference to FIGS. 1A and 1B, or below with reference to FIGS. 3, 4, and 5, via the communication unit 245.

In some embodiments, the communication module 202 receives data from components of the mitigation system 199 and stores the data in the memory 227 (or a buffer or cache of the memory 227, or a standalone buffer or cache which is not depicted in FIG. 2). For example, the communication module 202 receives the weather data 193 and the disaster data 194 from the communication unit 245 and stores the weather data 193 and the disaster data 194 in the memory 227.

In some embodiments, the communication module 202 may handle communications between components of the mitigation system 199.

The determination module 204 can be software including routines for executing one or more steps of the method 300 described below with reference to FIG. 3. In some embodiments, the determination module 204 can be software including routines for executing the steps of the flow process 101 described above with reference to FIG. 1B.

In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

Example Method

Referring now to FIG. 3, depicted is a method 300 for providing disaster mitigation for connected vehicles having hidden vehicle functionality according to some embodiments. The steps of the method 300 are executable in any order, and not necessarily the order depicted in FIG. 3.

At step 301, electronic weather data and electronic disaster data are accessed to identify the occurrence of extreme events in a specific geographic region where a connected vehicle is located. For example, the mitigation system of an ego vehicle issues an unlock command to unlock or reconfigure a hidden vehicle functionality of the ego vehicle so that the hidden vehicle functionality is accessible. An extreme event includes, for example, a hurricane, a tornado, a forest fire, an earthquake, a volcanic eruption, a tsunami, an act of war, etc. The weather data is digital data that describes the weather and weather events such as hurricanes, tornados, tsunamis, etc. The weather data is provided by the NWS, or some other source of electronic weather data. The disaster data is digital data that describes natural disasters and other extreme events. The disaster data is provided by the FEMA which publishes streams of disaster data electronically accessible via their servers.

At step 303, all software-based functionality (e.g., battery capacity limit, telematics) that would assist the driver of the ego vehicle to respond appropriately to the extreme event (i.e., evacuate) are automatically, and temporarily, unlocked.

At step 305, electronic weather data and electronic disaster data are accessed to identify that the extreme event has ended.

At step 307, all the software-based functionality that was unlocked in step 303 is automatically locked responsive to the extreme event being determined to have ended at step 305. For example, the mitigation system of an ego vehicle issues a lock command to lock or reconfigure a hidden vehicle functionality of the ego vehicle so that the hidden vehicle functionality is inaccessible.

In some embodiments, the unlock command of step 303 triggers a software update in the sense that the hidden vehicle functionality is unlocked or reconfigured responsive to the unlock command. In other words, the mitigation system of the ego vehicle itself determines to update the software of the ego vehicle and provides the electronic signal that achieves this software update. By comparison, in the existing solutions the decision to update the software of the vehicle is always determined by a cloud server and not locally on the vehicle itself as is done by the embodiments of the mitigation system described herein. Furthermore, in the existing solutions the software update is achieved by a timely process that requires a cloud server to send an electronic signal that triggers the software update (i.e., the vehicle features to be unlocked); this approach is undesirable for situations involving extreme events because it is time consuming and time is of the essence when extreme events are involved. By comparison, the mitigation system of the ego vehicle generates the unlock command locally on the ego vehicle itself so that wireless communication with a cloud server is not needed to generate this unlock command. Our research indicates that this approach saves significant amounts of time relative to the existing solutions and will likely save lives relative to the existing solutions.

Referring now to FIG. 4, depicted is a block diagram illustrating an example of the BSM data 198 according to some embodiments.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints. In some embodiments, one or more of the vehicles 123, 124 depicted in FIG. 1A and the infrastructure device 122 depicted in FIG. 1A are DSRC-equipped endpoints.

Referring now to FIG. 5, depicted is a block diagram illustrating an example of BSM data 198 according to some embodiments.

A BSM may include two parts. These two parts may include different BSM data 198 as shown in FIG. 12.

Part 1 of the BSM data 198 may describe one or more of the following: the GPS data 192 of the vehicle; vehicle heading; vehicle speed; vehicle acceleration; vehicle steering wheel angle; and vehicle size.

Part 2 of the BSM data 198 may include a variable set of data elements drawn from a list of optional elements. Some of the BSM data 198 included in Part 2 of the BSM are selected based on event triggers, e.g., anti-locking brake system ("ABS") being activated may trigger BSM data 198 relevant to the ABS system of the vehicle.

In some embodiments, some of the elements of Part 2 are transmitted less frequently in order to conserve bandwidth.

In some embodiments, the BSM data 198 included in a BSM includes one or more of the weather data 193 and the disaster data 194 which are transmitted to the ego vehicle 123 via the BSM.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   determining, by an onboard vehicle computer of a vehicle, that an extreme event is occurring; and
   automatically unlocking, by the onboard vehicle computer, hidden vehicle functionality of the vehicle responsive to determining that the extreme event is occurring, wherein the hidden vehicle functionality includes an Advanced Driver Assistance System (ADAS) functionality that is locked so that the ADAS functionality was previously inaccessible by a driver of the vehicle and is now available to assist the driver to respond to the extreme event.

2. The method of claim 1, wherein the extreme event is selected from a group that consists of one or more of the following: a natural disaster; a hurricane; a tornado; a forest fire; an earthquake; a volcanic eruption; a tsunami; or an act of war.

3. The method of claim 1, wherein determining that the extreme event is occurring is based on an occurrence of a natural disaster in a specific geographic region.

4. The method of claim 1, wherein the vehicle is a first vehicle and further comprising:
receiving, from a second vehicle, an electronic communication with weather data describing a weather event or disaster data describing the extreme event.

5. The method of claim 4, wherein the electronic communication is a basic safety message.

6. The method of claim 1, wherein the hidden vehicle functionality includes one or more of: extending a battery range of the vehicle or modifying a telematics functionality of the vehicle.

7. The method of claim 1, wherein the vehicle is a first vehicle and the extreme event is determined to be occurring responsive to digital data that is received from one of a second vehicle or an infrastructure device while the vehicle does not have access to a cellular network.

8. A system of a vehicle comprising:
an onboard unit of the vehicle that is communicatively coupled to a non-transitory memory that stores computer code that is operable, when executed by the onboard unit, to cause the onboard unit to:
determine, by the onboard unit, that an extreme event is occurring; and
automatically unlocking, by the onboard unit, hidden vehicle functionality of the vehicle responsive to determining that the extreme event is occurring, wherein the hidden vehicle functionality includes an Advanced Driver Assistance System (ADAS) functionality that is locked so that the ADAS functionality was previously inaccessible by a driver of the vehicle and is now available to assist the driver to respond to the extreme event.

9. The system of claim 8, wherein the extreme event is selected from a group that consists of one or more of the following: a natural disaster; a hurricane; a tornado; a forest fire; an earthquake; a volcanic eruption; a tsunami; or an act of war.

10. The system of claim 8, wherein determining that the extreme event is occurring is based on an occurrence of a natural disaster in a specific geographic region.

11. The system of claim 8, wherein the vehicle is a first vehicle and the onboard unit is further operable to:
receive, from a second vehicle, an electronic communication with weather data describing a weather event or disaster data describing the extreme event.

12. The system of claim 11, wherein the electronic communication is a basic safety message.

13. The system of claim 8, wherein the vehicle is at least a Level 3 automated vehicle.

14. The system of claim 8, wherein the vehicle is a first vehicle and the extreme event is determined to be occurring responsive to digital data that is received from one of a connected vehicle or an infrastructure device while the vehicle does not have access to a cellular network.

15. A computer program product of a vehicle comprising instructions that, when executed by an onboard unit of the vehicle, cause the onboard unit to perform operations comprising:
determining, by the onboard unit of the vehicle, that an extreme event is occurring; and
automatically unlocking, by the onboard unit, hidden vehicle functionality of the vehicle responsive to determining that the extreme event is occurring wherein the hidden vehicle functionality includes an Advanced Driver Assistance System (ADAS) functionality that is locked so that the ADAS functionality was previously inaccessible by a driver of the vehicle and is now available to assist the driver to respond to the extreme event.

16. The computer program product of claim 15, wherein the extreme event is selected from a group that consists of one or more of the following: a natural disaster; a hurricane; a tornado; a forest fire; an earthquake; a volcanic eruption; a tsunami; or an act of war.

17. The computer program product of claim 15, wherein determining that the extreme event is occurring is based on an occurrence of a natural disaster in a specific geographic region.

18. The computer program product of claim 15, wherein the vehicle is a first vehicle and the operations further comprise:
receiving, from a second vehicle, an electronic communication with weather data describing a weather event or disaster data describing the extreme event.

19. The computer program product of claim 18, wherein the electronic communication is a basic safety message.

20. The computer program product of claim 15, wherein the vehicle is a first vehicle and the extreme event is determined to be occurring responsive to digital data that is received from one of a second vehicle or an infrastructure device while the vehicle does not have access to a cellular network.

* * * * *